US010921551B2

(12) United States Patent
Ito (10) Patent No.: US 10,921,551 B2
(45) Date of Patent: Feb. 16, 2021

(54) MOVING SPEED CONTROL METHOD OF OPTICAL ELEMENT SWITCHING DEVICE

(71) Applicant: MITUTOYO CORPORATION, Kawasaki (JP)

(72) Inventor: Takahiro Ito, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 15/177,571

(22) Filed: Jun. 9, 2016

(65) Prior Publication Data

US 2016/0363738 A1 Dec. 15, 2016

(30) Foreign Application Priority Data

Jun. 10, 2015 (JP) .................................. 2015-117817

(51) Int. Cl.
*G02B 7/16* (2006.01)
*G02B 21/24* (2006.01)

(52) U.S. Cl.
CPC ............ *G02B 7/16* (2013.01); *G02B 21/248* (2013.01)

(58) Field of Classification Search
CPC .... H04N 1/02409; H04N 1/03; H04N 5/2254; H04N 5/23203; H04N 5/23212; H04N 5/23248; H04N 5/23258; H04N 5/23287; H04N 1/312; H02N 2/025; H02N 2/062; G01N 1/312; G01N 2035/00049; G01N 2035/00138; G01N 2035/0441;
(Continued)

(56) References Cited

U.S. PATENT DOCUMENTS 6,281,657 B1 8/2001 Matsuo
6,323,995 B1 * 11/2001 Takahama .............. G02B 7/003
359/371
(Continued)

FOREIGN PATENT DOCUMENTS

CN 1511248 7/2004
CN 102597841 7/2012
(Continued)

OTHER PUBLICATIONS

Chinese Office Action dated Nov. 5, 2019, English abstract included, 16 pages.

*Primary Examiner* — Thomas K Pham
*Assistant Examiner* — Ibrahima Diedhiou
(74) *Attorney, Agent, or Firm* — Rankin, Hill & Clark LLP (57) ABSTRACT

A moving speed control method of an optical element switching device including a fixing member, a moveable member having a plurality of recess portions configured to hold one or more optical elements, a driving device supported to the fixing member and configured to move the moveable member, and an engaging mechanism supported to the fixing member and configured to be engaged to the recess portion to thereby position each of the one or more optical elements on an optical axis, the moving speed control method includes: starting to move the moveable member from a state where the recess portion is engaged to the engaging mechanism; accelerating a moving speed of the moveable member; decelerating the moving speed when the engaging mechanism is to be engaged to the next recess portion; and making the moving speed zero when the engaging mechanism is engaged to the recess portion.

3 Claims, 9 Drawing Sheets

(58) Field of Classification Search
CPC .......... G02B 7/003; G02B 7/02; G02B 7/021;
G02B 7/023; G02B 7/027; G02B 7/08;
G02B 7/10; G02B 7/102; G02B 7/14;
G02B 7/16; G02B 7/1805; G02B 7/28;
G02B 7/36; G02B 13/16; G02B 15/14;
G02B 21/0016; G02B 21/002; G02B
21/0036; G02B 21/006; G02B 21/06;
G02B 21/24; G02B 21/244; G02B
21/245; G02B 21/248; G02B 21/26;
G02B 21/34; G02B 21/361; G02B
21/365; G02B 21/367; G02B 27/646;
B01L 9/52; B01L 2200/025; B01L
2200/18; B01L 2300/0822; G03B 3/10;
G03B 5/00; G03B 17/12; G03B 17/14;
G03B 21/53; G03B 2205/0007; G03B
2205/0015; G03B 2205/0069; G11B
7/0956; G11B 7/08582; G11B 7/093
USPC .......... 33/503, 550, 553, 557, 558; 206/456;
211/26; 250/201.2, 201.3, 201.7, 208.1,
250/231.13, 231.16, 453.11; 310/323.02;
318/627; 347/20, 225; 348/E5.028,
348/E5.043, 79, 80, 208.11, 340;
352/140; 353/101; 359/362, 368, 370,
359/371, 381, 385, 388, 391, 489.09, 554,
359/557, 694, 696, 700, 701, 813, 820,
359/821, 823, 831; 369/44.21; 396/55,
396/79, 133; 720/674, 675, 691
See application file for complete search history.

(56) References Cited

U.S. PATENT DOCUMENTS

| | | |
|---|---|---|
| 2003/0147087 A1* | 8/2003 | Nolte .................. G02B 7/16 |
| | | 356/614 |
| 2004/0149883 A1 | 8/2004 | Eda |
| 2011/0101203 A1 | 5/2011 | Cooper et al. |
| 2011/0309231 A1 | 12/2011 | Cooper et al. |
| 2013/0021665 A1 | 1/2013 | Kubek |
| 2013/0134294 A1 | 5/2013 | Cooper et al. |

FOREIGN PATENT DOCUMENTS

| | | |
|---|---|---|
| CN | 102890321 | 1/2013 |
| JP | 10-082946 | 3/1998 |

\* cited by examiner

|  | SENSOR 144A | SENSOR 144B | SENSOR 144C |
|---|---|---|---|
| OPTICAL ELEMENT 126A | H | H | H |
| OPTICAL ELEMENT 126B | H | H | L |
| OPTICAL ELEMENT 126C | H | L | H |
| OPTICAL ELEMENT 126D | L | H | H |

MOVING SPEED CONTROL METHOD OF OPTICAL ELEMENT SWITCHING DEVICE

CROSS-REFERENCE TO RELATED APPLICATION(S)

This application is based upon and claims the benefit of priority from Japanese Patent Application No. 2015-117817, filed on Jun. 10, 2015, the entire contents of which are incorporated herein by reference.

BACKGROUND

1. Field of the Invention

The disclosure relates to a moving speed control method of an optical element switching device that is to be used for an image measurement apparatus including a microscope and the like, and more particularly, to a moving speed control method of an optical element switching device capable of preventing the durability from being lowered due to switching of an optical element.

2. Description of the Related Art

In the related art, an optical element switching device as described in JP-A-H10-82946 has been used. The optical element switching device includes a fixing member, a moveable member having a plurality of recess portions configured to hold one or more optical elements and provided for positioning in correspondence to each of the one or more optical elements and moveably supported to the fixing member, a driving device supported to the fixing member and configured to move the moveable member, and an engaging mechanism supported to the fixing member and configured to be engaged to the recess portion to thereby position each of the one or more optical elements on an optical axis. That is, the optical element switching device has a configuration where a click ball of the engaging mechanism is dropped to the recess portion and each optical element is thus positioned.

However, according to the optical element switching device having the above configuration, when the optical element is moved, the click ball is necessarily dropped to each recess portion. That is, whenever the moveable member is moved to pass the optical element over the optical axis, the click ball is dropped to the recess portion, so that vibration is caused.

For this reason, even when the optical element simply passes over the optical axis, the vibration is caused to change a mounted state of the optical element switching device, to promote the wear/consumption of each constitutional element and to lower the durability.

SUMMARY

An object of the disclosure is to provide a moving speed control method of an optical element switching device capable of preventing the durability from being lowered due to switching of an optical element.

According to a first aspect of the invention, there is provided a moving speed control method of an optical element switching device including a fixing member, a moveable member having a plurality of recess portions configured to hold one or more optical elements and provided for positioning in correspondence to each of the one or more optical elements and moveably supported to the fixing member, a driving device supported to the fixing member and configured to move the moveable member, and an engaging mechanism supported to the fixing member and configured to be engaged to the recess portion to thereby position each of the one or more optical elements on an optical axis, the moving speed control method including: starting to move the moveable member from a state where the recess portion is engaged to the engaging mechanism; accelerating a moving speed of the moveable member; decelerating the moving speed when the engaging mechanism is to be engaged to the next recess portion; and making the moving speed zero when the engaging mechanism is engaged to the recess portion.

According to a second aspect of the invention, in the moving speed control method according to the first aspect, when continuing to decelerate the moving speed by a maximum deceleration upon the deceleration of the moving speed, the moving speed may become zero upon engagement of the engaging mechanism to the recess portion or the moving speed may become zero before the engaging mechanism is engaged to the recess portion.

According to a third aspect of the invention, in the moving speed control method according to the first aspect or the second aspect, the deceleration of the moving speed may start at an intermediate position between the recess portions or at a position before the intermediate position.

According to a fourth aspect of the invention, in the moving speed control method according to any one of the first aspect to the third aspect, a magnitude of the deceleration of the moving speed may be smaller at the end of the deceleration, as compared to the start of the deceleration of the moving speed.

According to a fifth aspect of the invention, in the moving speed control method according to any one of the first aspect to the fourth aspect, the optical element switching device may include a storage unit, and the moving speed may be determined by a control signal stored in advance in the storage unit.

According to a sixth aspect of the invention, in the moving speed control method according to any one of the first aspect to the fifth aspect, the optical element switching device may include a detection unit configured to detect positions corresponding to the recess portions, and when the engaging mechanism is engaged to each of the recess portions, a driving signal for driving the driving device may be corrected on the basis of an output of the detection unit.

According to the disclosure, it is possible to prevent the durability from being lowered due to the switching of the optical element.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, illustrative embodiments of the disclosure will be described in detail with reference to the drawings.

A first illustrative embodiment of the disclosure is described with reference to FIGS. 1 to 8.

First, a schematic configuration of an image measurement apparatus for which an optical element switching device is to be used is described with reference to FIG. 1.

Figure 1:
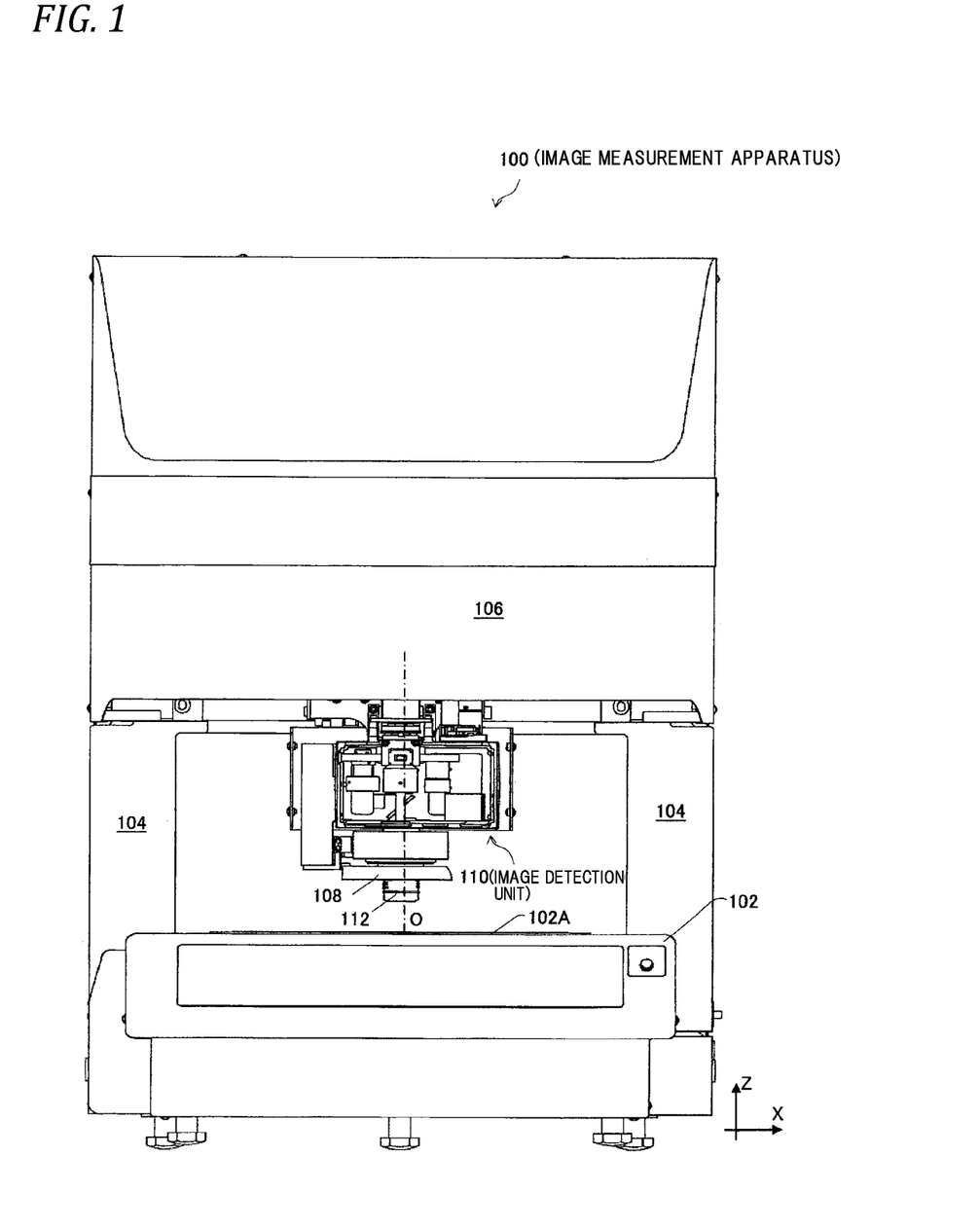
FIG. 1 is a pictorial view showing an example of an image measurement apparatus according to a first illustrative embodiment of the disclosure.

As shown in FIG. 1, an image measurement apparatus 100 includes a base 102, a pair of columns 104 provided upright on the base 102, and a beam (not shown) extending between the pair of columns 104. An XZ movement mechanism (not shown) configured to move in X and Z directions is arranged on the beam, which are accommodated inside an upper cover 106. An image detection unit 110 is attached on the XZ movement mechanism. The image detection unit 110 is provided with an illumination system 108. In the meantime, the base 102 is incorporated with a Y movement mechanism (not shown) configured to move a base surface 102A in a Y direction. For this reason, it is possible to three-dimensionally move the image detection unit 110 relative to an object to be measured, which is put on the base surface 102A, so that the image measurement apparatus 100 can measure the object to be measured in a three dimensional manner.

The schematic configurations of the image detection unit 110 and an optical element switching device 120 are described with reference to FIGS. 2A and 2B to FIG. 5.

Figure 2A:
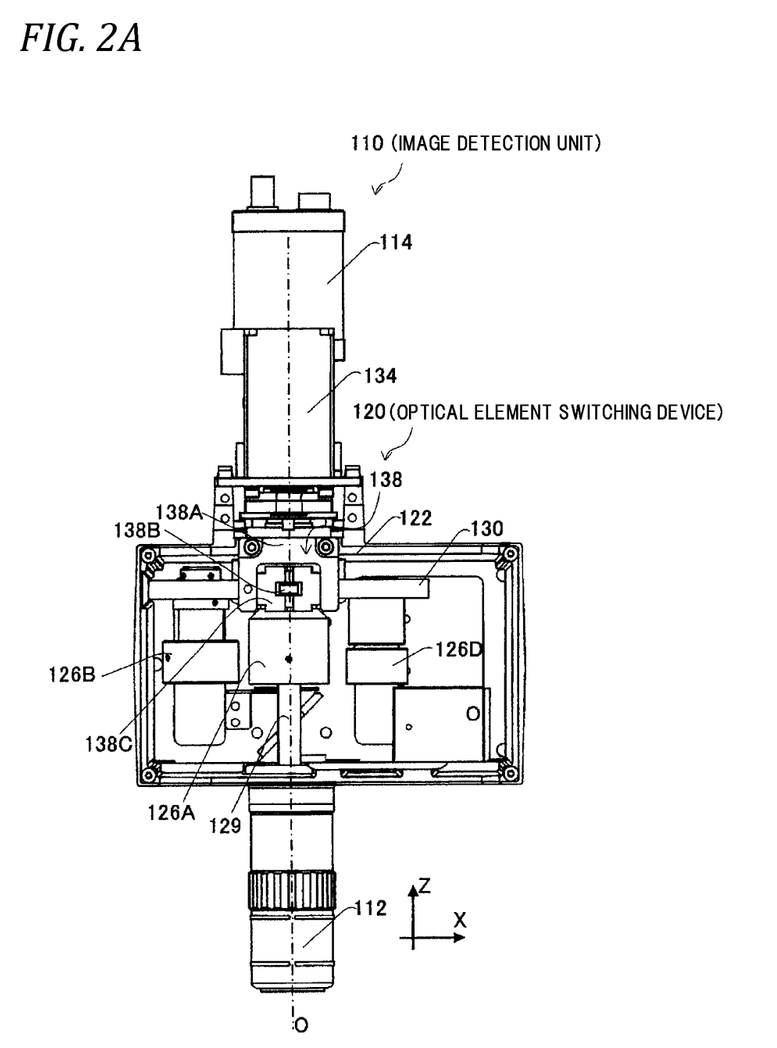
FIG. 2A pictorially shows a front view of an image detection unit where a cover is partially detached.
Figure 2B:
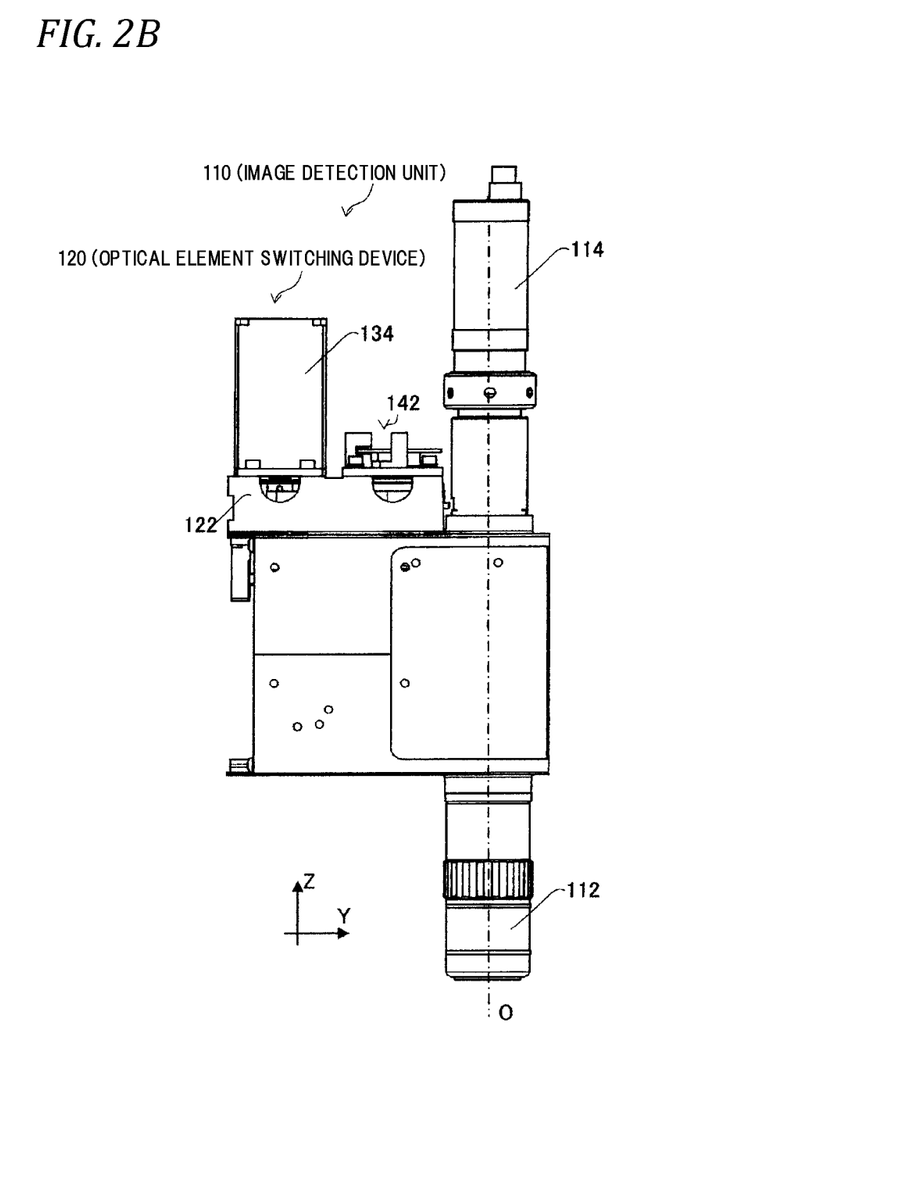
FIG. 2B is a side view of the image detection unit where the cover is partially detached.
Figure 3:
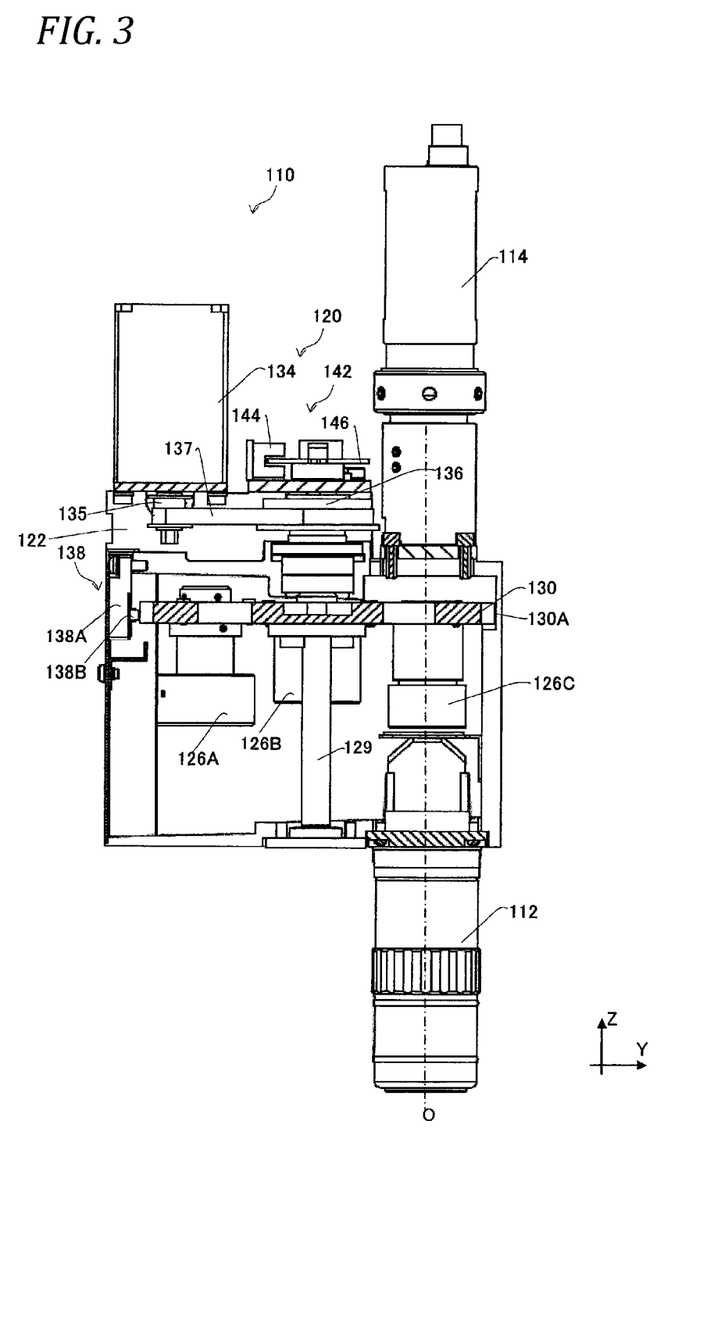
FIG. 3 is a side view showing a partial section of the image detection unit.

As shown in FIGS. 2A and 2B and FIG. 3, the image detection unit 110 has an objective lens 112, optical elements 126A, 126B, 126C, 126D (which are collectively referred to as optical elements 126) to be switched by an optical element switching device 120, and a CCD camera 114 configured to detect an image that is to be formed by the objective lens 112 and the optical elements 126. That is, the image detection unit 110 can detect a variety of images (for example, images having different magnifications) with the optical elements 126 that are to be switched by the optical element switching device 120.

As shown in FIGS. 2A and 2B to FIG. 5, the optical element switching device 120 has a casing (the fixing member) 122, a turret (the moveable member) 130, a driving device 134, an engaging mechanism 138, and a position check mechanism 142. That is, the optical element switching device 120 is configured to function as a power turret configured to move and switch the optical elements 126 held to the turret 130 relative to an optical axis O of the image detection unit 110 by the driving device 134.

In the below, the constitutional elements of the optical element switching device 120 are described.

As shown in FIGS. 2A and 2B to FIGS. 4A and 4B, the casing 122 is configured to support not only the turret 130 but also the driving device 134, the engaging mechanism 138 and the position check mechanism 142. The casing 122 is also configured to support the objective lens 112 and the CCD camera 114, too, and to function as a casing of the image detection unit 110.

Figure 4A:
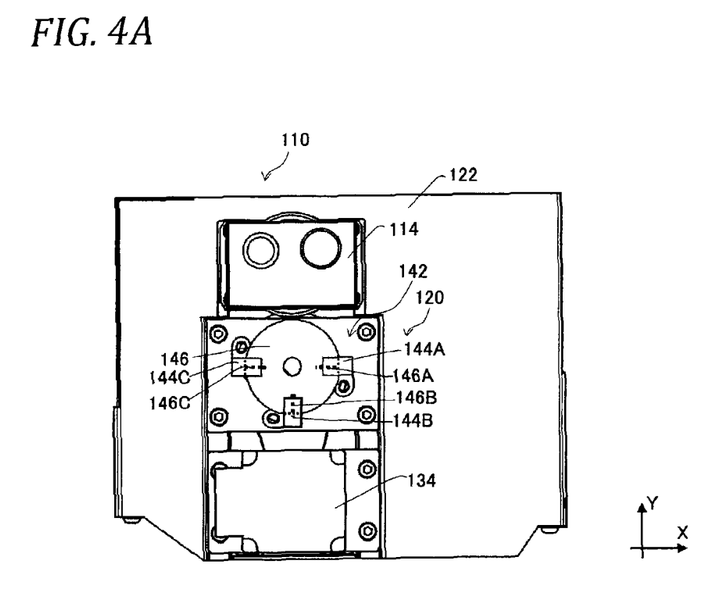
FIG. 4A pictorially shows a top view of the image detection unit.
Figure 4B:
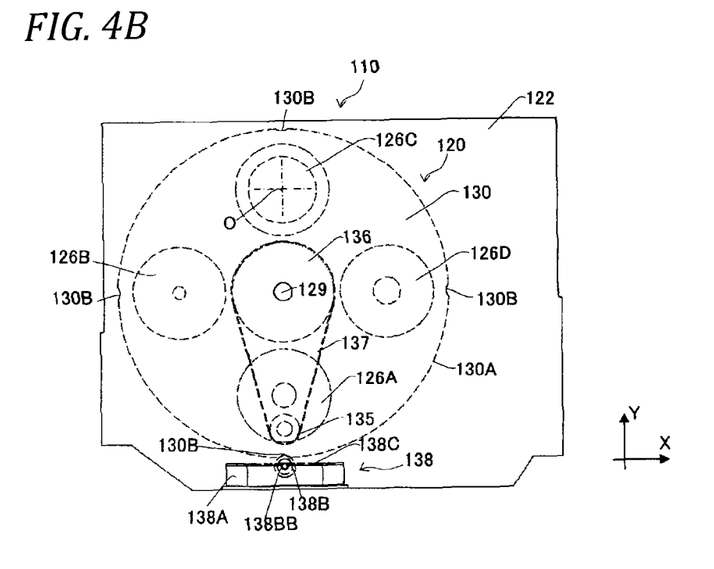
FIG. 4B is a schematic top perspective view of the image detection unit.
Figure 5:
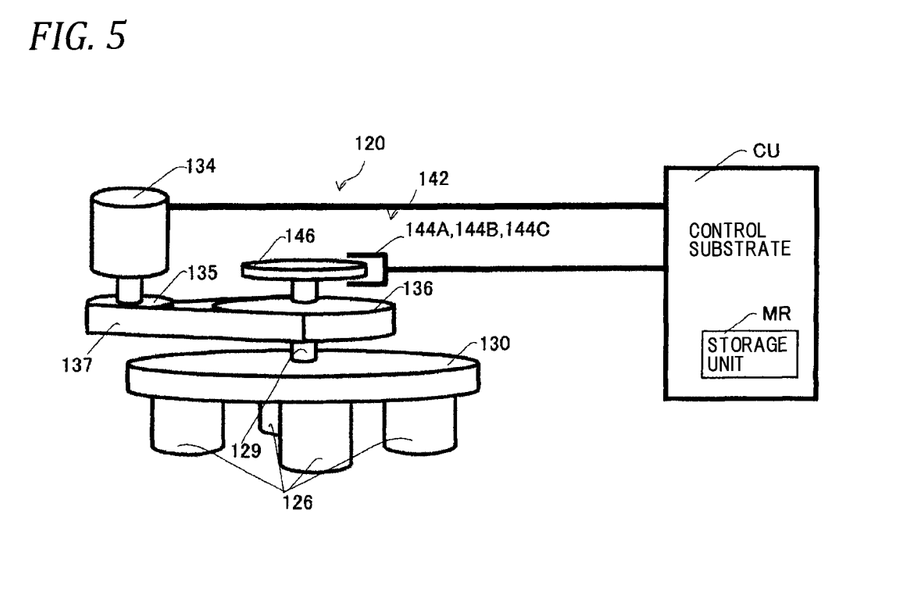
FIG. 5 schematically shows a relation among constitutional elements of the optical element switching device.

As shown in FIGS. 2A, 2B, 3 and 5, the turret 130 is configured to hold the four optical elements 126 and is moveably supported to the casing 122. Specifically, as shown in FIGS. 4B and 5, the turret 130 has a disc shape. The optical elements 126 are held at equal intervals (90°) in a circumferential direction at equidistantly radial positions from a center of rotation of the turret 130. In the meantime, a shaft 129 is coupled to a center of the turret 130. For this reason, when the turret 130 is rotated relative to the casing 122 about the shaft 129, the four optical elements 126 are switched. As shown in FIGS. 3, 4B and 5, the shaft 129 is provided with a driven pulley 136.

Also, as shown in FIGS. 3 and 4B, the turret 130 is provided with a detent 130A. The detent 130A is a member that is held to the casing 122 at a predetermined position (a predetermined angle) by the engaging mechanism 138 and is configured to position each of the four optical elements 126 on the turret 130. Specifically, the detent 130A is configured as an outer periphery side surface of the turret 130 (i.e., the detent 130A is provided to be substantially parallel with the optical axis O, in other words, side surfaces of the optical elements 126). As shown in FIG. 4B, the detent 130A is provided with substantially V-shaped recess portions 130B for positioning in correspondence to each of the four optical elements 126. In the first illustrative embodiment, since the four optical elements 126 are provided, the recess portions 130B are provided at a 90° interval for the turret 130. Meanwhile, in the first illustrative embodiment, the optical elements 126 are the intermediate lenses having different magnifications, for example. However, polarization plates, phase plates or the like may also be used.

As shown in FIGS. 3 and 5, the driving device 134 is a device supported to the casing 122 and configured to move (rotate) the turret 130. Specifically, the driving device is an electric pulse motor or the like. The driving device 134 is provided with a driving pulley 135, and is configured to rotate the driven pulley 136 coupled to the turret 130 via a timing belt 137. That is, the turret 130 is electrically driven by the driving device 134.

As shown in FIGS. 2A, 3 and 4B, the engaging mechanism 138 is a mechanism supported to the casing 122 and configured to be engaged to the recess portion 130B of the turret 130 to thereby position each of the four optical elements 126 on the optical axis O. Specifically, the engaging mechanism 138 has a holding member 138A, a bearing member 138B, a shaft member 138BB and a plate spring 138C.

As shown in FIG. 2A, the holding member 138A is a U-shaped member having a pair of support parts, and is fixed to an inside of the casing 122 so that it confronts to the detent 130A. Both end portions of the plate spring 138C are supported at sides (the detent 130A-sides) of the pair of support parts facing towards the turret 130.

As shown in FIG. 2A, a central portion of the plate spring 138C is formed with an opening so that the bearing member 138B can be arranged therein in a non-contact manner. The plate spring 138C is provided with two bent parts, which are bent so that the detent 130A-sides thereof have a concave shape, as if they extend over the opening. The bent part is contacted at its concave shape part to the shaft member 138BB configured to support the bearing member 138B. That is, the shaft member 138BB is pressed towards the turret 130 by the bent parts. Therefore, as shown in FIG. 4B, the plate spring 138C can apply a pressing force to the detent 130A (which is substantially parallel with the side surfaces of the optical elements 126) via the bearing member 138B (supported to the casing 122) (i.e., the engaging mechanism 138 is arranged to apply the pressing force to the detent 130A from the side surfaces of the optical elements 126).

As shown in FIG. 4B, the shaft member 138BB is supported to the plate spring 138C. The bearing member 138B is rotatably supported to the shaft member 138BB via a rolling element and the like. The bearing member 138B has a cylindrical shape. The bearing member 138B is configured to be pressed to the plate spring 138C via the shaft member 138BB and to be engaged to the detent 130A (direct contact).

The position check mechanism 142 is a mechanism for checking which optical element 126 is positioned on the optical axis O. That is, the position check mechanism 142 enables the optical element 126, which is positioned on the optical axis O when the engaging mechanism 138 is engaged to the recess portion 130B, to be checked (specified). As shown in FIGS. 3, 4A and 5, the position check mechanism 142 has three sensors 144A, 144B, 144C (which are also collectively referred to as the sensors 144) and an index plate 146. The sensor 144 is a photo-coupler or the like configured by a light emitting element and a light receiving element, for example. The index plate 146 has a disc shape and is fixed to the shaft 129 configured to support the turret 130. As shown in FIG. 4A, a plurality of circumferential parts (for example, three portions every 90°) of the index plate 146 is provided with slits 146A, 146B, 146C corresponding to the positions of the optical elements 126. For example, when lights from the light emitting elements of the sensors 144 pass through the slits 146A, 146B, 146C and are received at the light receiving elements, the sensors 144 output an 'H' signal. When the lights from the light emitting elements of the sensors 144 are shielded by the index plate 146, the sensors 144 outputs an 'L' signal. As shown in FIG. 5, the 'H' signal and the 'L' signal are output to a control substrate CU. As a result, a position (angle) of each optical element 126 resulting from the movement control can be checked by processing the output of the sensor 144 at the control substrate CU.

The outputs of the sensors 144 are described with reference to FIGS. 6A and 6B, for example.

Figure 6A:
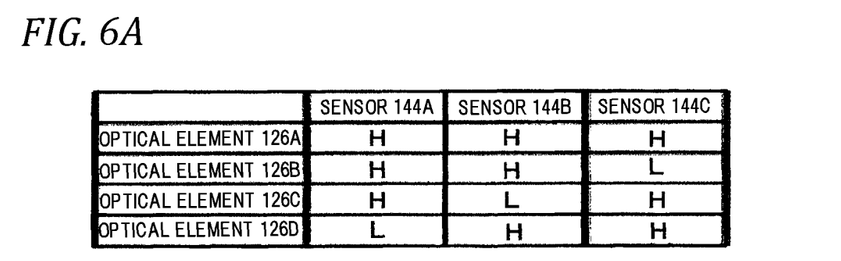
FIG. 6A is a table showing a relation between sensor outputs of a position check mechanism and optical elements positioned on an optical axis.
Figure 6B:
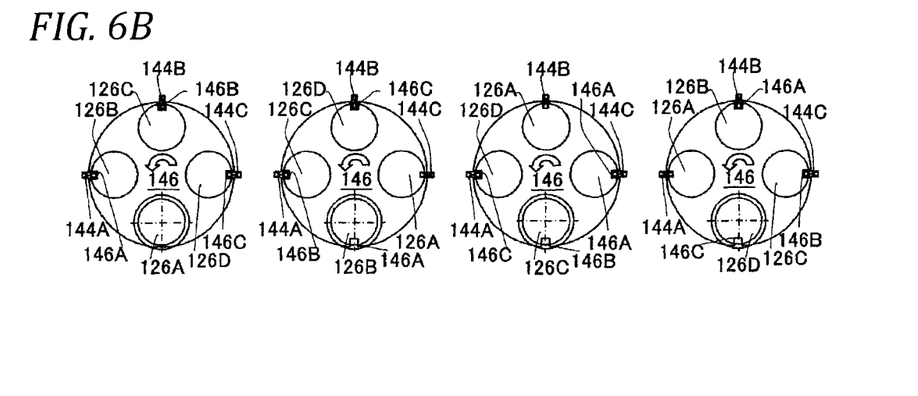
FIG. 6B shows positions of an index plate and positions of the sensors, which are moved when the optical elements are changed.

FIG. 6A is a table showing a relation between the outputs of the sensors 144 and the optical elements 126 positioned on the optical axis O, and FIG. 6B shows positions of the index plate 146 and positions of the sensors 144 when changing (moving) the optical elements 126. In the meantime, FIG. 6B shows the index plate 146 and the sensors 144. However, in order to easily determine the positions of the optical elements 126, the positions of the optical elements 126A, 126B, 126C, 126D are denoted by white circles (the optical element 126 positioned on the optical axis O is particularly denoted by a white double circle) overlapping over the index plate 146 for convenience sake. Also, a cross shape denoted by a dashed-dotted line indicates the optical axis O. Also, an outline arrow indicates a moving direction (rotating direction) P.

As shown in FIG. 6B, a slit is not provided at a position of the index plate 146 corresponding to the position of the optical element 126A, and the slits 146A, 146B, 146C are respectively provided at positions of the index plate 146 corresponding to the positions of the optical elements 126B, 126C, 126D.

At a first position of the index plate 146 from the left side of FIG. 6B, the slits 146A, 146B, 146C are located at the positions of all the sensors 144. For this reason, the outputs of all the sensors 144 are 'H'. Also, as indicated at the first line of FIG. 6A, it can be seen on the control substrate CU that the optical element 126A is positioned on the optical axis O.

At a second position of the index plate 146 from the left side of FIG. 6B, the slits 146B, 146C are located at the positions of the sensors 144A, 144B, and the slit is not located at the position of the sensor 144C. For this reason, the outputs of the sensors 144A, 144B are 'H' and the output of the sensor 144C is 'L.' Also, as indicated at the second line of FIG. 6A, it can be seen on the control substrate CU that the optical element 126B is positioned on the optical axis O.

At a third position of the index plate 146 from the left side of FIG. 6B, the slits 146C, 146A are located at the positions of the sensors 144A, 144C, and the slit is not located at the position of the sensor 144B. For this reason, the outputs of the sensors 144A, 144C are 'H' and the output of the sensor 144B is 'L.' Also, as indicated at the third line of FIG. 6A, it can be seen on the control substrate CU that the optical element 126C is positioned on the optical axis O.

At a first position of the index plate 146 from the right side of FIG. 6B, the slits 146A, 146B are located at the positions of the sensors 144B, 144C, and the slit is not located at the position of the sensor 144A. For this reason, the outputs of the sensors 144B, 144C are 'H' and the output of the sensor 144A is 'L.' Also, as indicated at the fourth line of FIG. 6A, it can be seen on the control substrate CU that the optical element 126D is positioned on the optical axis O.

In the meantime, as can be clearly seen from FIGS. 4A and 4B, a positional relation between the four recess portions 130B and the three slits 146A, 146B, 146C of the index plate 146 is defined. That is, it can be said that the sensors 144 are configured to detect the positions corresponding to the four recess portions 130B. In other words, it can be said that the optical element switching device 120 has the detection unit (the sensors 144) configured to detect the positions corresponding to the recess portions 130B.

As shown in FIG. 5, the control substrate CU is connected to the driving device 134 and the sensors 144A, 144B, 144C. The control substrate CU is embedded in a controller (not shown), for example, and is configured to perform a variety of processing/controls at a processing unit (not shown). For example, the control substrate CU is configured to set a driving pulse signal (driving signal) and to drive the driving device 134 by feed/forward controlling the same with the driving pulse signal (the driving device may also be DC-controlled by a DC voltage value or the like). Specifically, a moving speed V, a moving direction (rotating direction) P, a movement amount (rotating angle θ) and the like of the turret 130 are defined by the driving pulse signal.

Also, the control substrate CU is connected with an input unit (not shown) and is input with a change command (switching command) of the optical element 126 and the like from the input unit. On the other hand, the moving speed V, the moving direction (rotating direction) P, the movement amount (rotating angle θ) and the like of the turret 130 may be directly input from the input unit.

Also, the control substrate CU is provided with a storage unit MR in which a variety of initial values/update values and the like for controlling the driving of the driving device 134 are stored. For example, the storage unit MR is configured to store therein control signals for defining the moving speed V and the like of the turret 130. In the control substrate CU, a control signal corresponding to the change command of the optical element 126 is read from the storage unit MR, and the driving pulse signal is set (in other words, the optical element switching device 120 has the storage unit MR, and the moving speed V is determined by the control signal stored in advance in the storage unit MR).

Also, the control substrate CU is configured to check (specify) the optical element 126 positioned on the optical axis O, based on the output (the 'H' signal or the 'L' signal) of the sensor 144, when the engaging mechanism 138 is engaged to the recess portion 130B, as described above. In the meantime, the control substrate CU can be configured to check a movement amount assumed between the recess portions 130B by the set driving pulse signal, based on the output of the sensor 144. Also, the control substrate CU can be configured to correct the driving pulse signal, as required (a correction value may be recorded in the storage unit MR). In this case, even when there is a difference between the position of the recess portion 130B assumed by the set driving pulse signal and the position of the recess portion 130B by the actual output of the sensor 144, the difference can be reset. Also, the difference can be prevented from being accumulated between the plurality of recess portions 130B.

Figure 7:
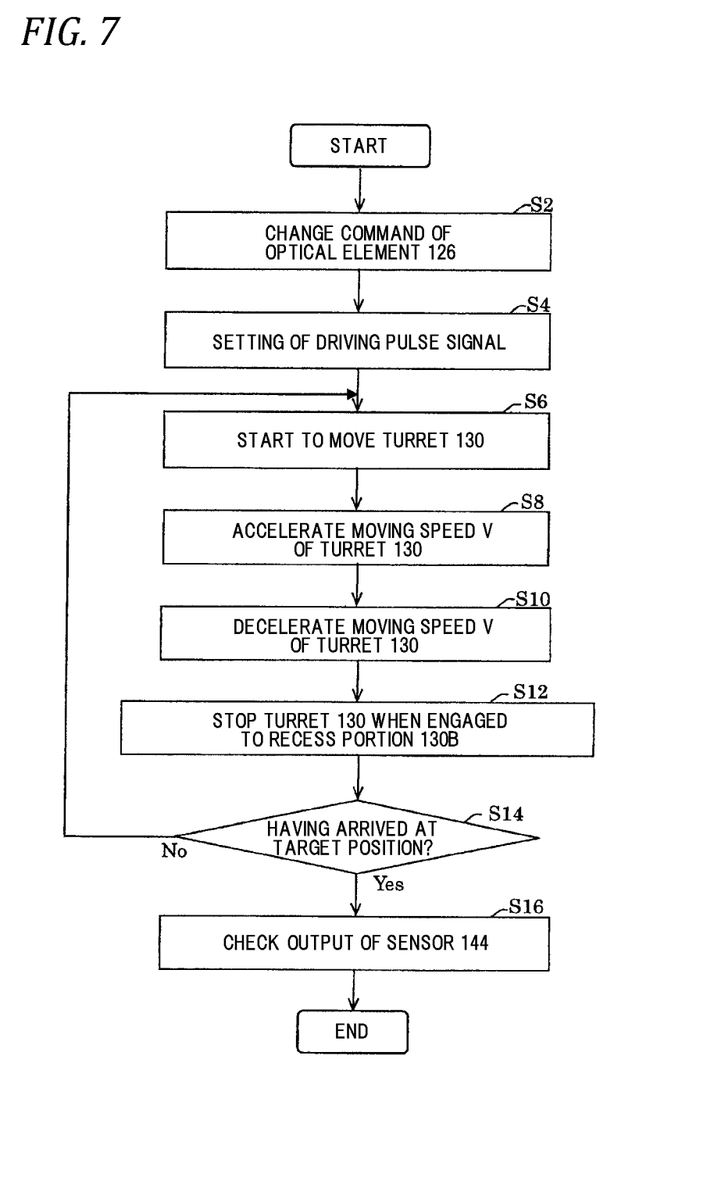
FIG. 7 is a flowchart showing a change sequence of the optical elements.
Figure 8A:
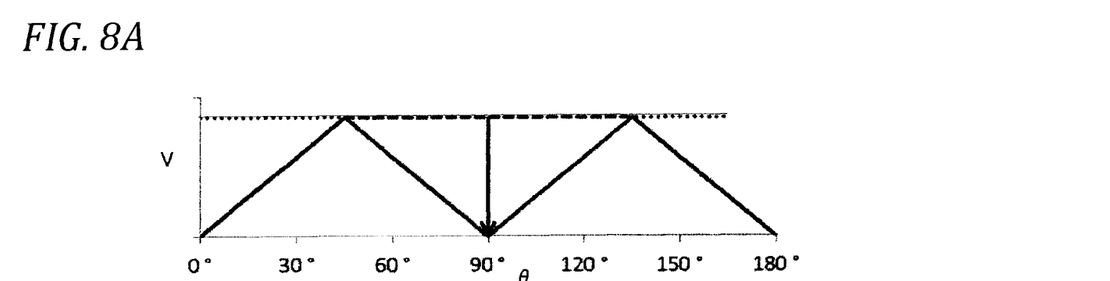
FIG. 8A pictorially illustrates a change in a moving speed relative to a rotating angle of a turret according to the illustrative embodiment.
Figure 8B:
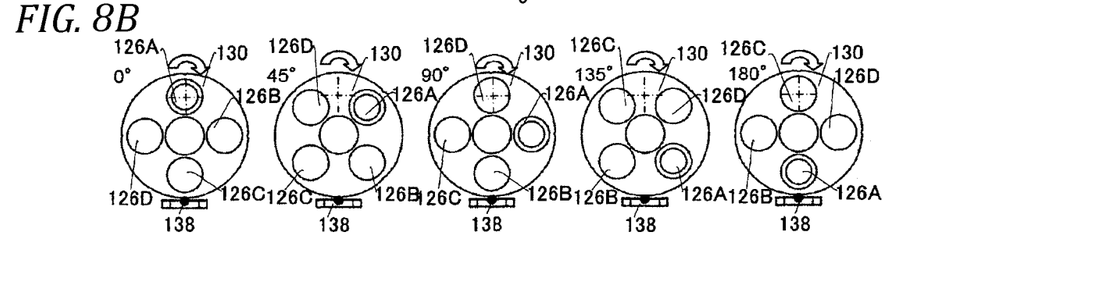
FIG. 8B is a top view showing arrangement of the turret the illustrative embodiment and an engaging mechanism, showing a positional relation thereof when the rotating angle θ is 0°, 45°, 90°, 135° and 180° from a left side.

Subsequently, an example of a moving speed control method of the optical element switching device 120 is described with reference to FIGS. 7, 8A and 8B. In the meantime, FIG. 7 is a flowchart showing a change sequence of the optical elements 126. FIG. 8A shows a change in the moving speed V relative to the rotating angle θ (0° to 180°). FIG. 8B is a top view showing arrangement of the turret 130 and the engaging mechanism 138, showing a positional relation thereof when the rotating angle θ is 0°, 45°, 90°, 135° and 180° from a left side. Meanwhile, in FIG. 8B, the optical element 126A is particularly denoted by the white double circle. Also, a cross shape denoted by a dashed-dotted line indicates the optical axis O. Also, an outline arrow indicates the moving direction (rotating direction) P.

In the first illustrative embodiment, when the rotating angle θ of the turret 130 is 0°, 90°, 180° and 270°, the optical element 126 is disposed on the optical axis O, respectively. Herein, it is assumed that the turret 130 is moved (rotated) from the rotating angle θ of 0° and the optical element 126 is thus switched.

First, a change command of the optical element 126 is output to the control substrate CU from the input unit (FIG. 7, step S2).

Then, the processing unit of the control substrate CU reads a control signal of the storage unit MR corresponding to the input change command of the optical element 126. Then, the processing unit sets a driving pulse signal on the basis of the control signal (FIG. 7, step S4). Specifically, the driving pulse signal defines the moving speed V, the moving direction (rotating direction) P, the movement amount (rotating angle θ) and the like of the turret 130.

Then, the driving pulse signal is output to the driving device 134, so that the turret 130 starts to move (rotate) in the moving direction P from a state where the recess portion 130B is engaged to the engaging mechanism 138 (a state of the rotating angle θ=0° shown in the first left view of FIG. 8B) (FIG. 7, step S6), as shown in FIG. 8A. At this time, the moving speed V of the turret 130 is accelerated by constant acceleration (FIG. 7, step S8). In the first illustrative embodiment, the constant acceleration is set to the maximum acceleration at which the driving device 134 does not lose steps.

Subsequently, the moving speed V of the turret 130 starts to decelerate at an accurately intermediate position with the next recess portion 130B in the moving direction P (a state of the rotating angle θ=45° shown in the second left view of FIG. 8B) (FIG. 7, step S10). In the first illustrative embodiment, the deceleration at that time is set to be the same as the maximum acceleration. For this reason, when the engaging mechanism 138 is engaged to the next recess portion 130B, the moving speed V can be zero (this state is a state where the moving speed V becomes zero upon the engagement of the engaging mechanism 138 to the recess portion 130B when the moving speed V is continuously decelerated by the maximum deceleration upon the deceleration of the moving speed V). Basically, in the first illustrative embodiment, when the engaging mechanism 138 is engaged to the next recess portion 130B, the moving speed V is decelerated.

Next, when the engaging mechanism 138 is engaged to the recess portion 130B (a state of the rotating angle θ=90° shown in the third left view of FIG. 8B), the moving speed V actually becomes zero (FIG. 7, step S12). That is, at this time, the turret 130 is once stopped.

Then, the processing unit determines whether the target optical element 126 is positioned on the optical axis O (whether the target optical element has arrived at the target position) by determining whether the driving device 134 has been driving-controlled by all the set driving pulse signals (FIG. 7, step S14).

When it is determined that the driving device 134 has been driving-controlled by all the set driving pulse signals, it is determined that the target optical element 126 is positioned on the optical axis O (FIG. 7, Yes in step S14). In this case, the output of the sensor 144 is subsequently checked (FIG. 7, step S16). Specifically, based on the output signal (the 'H' signal or the 'L' signal) output from the sensor 144 when the engaging mechanism 138 is engaged to the recess portion 130B, the optical element 126 positioned on the optical axis O is checked (specified). When the optical element 126 positioned on the optical axis O, which is determined from the output of the sensor 144, coincides with the optical element 126 positioned on the optical axis O, which has been driving-controlled by the driving pulse signal, the processing is over. On the other hand, when the optical element 126 positioned on the optical axis O, which is determined from the output of the sensor 144, does not coincide with the optical element 126 positioned on the optical axis O, which has been driving-controlled by the driving pulse signal, an output unit (not shown) outputs an error so as to receive an instruction from an operator, for example.

When it is determined that the driving device 134 has not been driving-controlled by all the set driving pulse signals, the driving device 134 is driving-controlled by the other of the set driving pulse signals (FIG. 7, No in step S14). In this case, the processing from step S6 to step S14 of FIG. 7 is repeated until the driving device 134 is driving-controlled by all the set driving pulse signals. In the meantime, since the cases of the rotating angle θ (90° to 180°) are the same as the cases of the rotating angle θ (0° to 90°) with respect to the moving speed V, the descriptions of the cases of the rotating angle θ (90° to 180°) in FIGS. 8A and 8B are omitted.

As described above, according to the first illustrative embodiment, when the engaging mechanism 138 is engaged to the recess portion 130B, the moving speed V becomes zero (0). Therefore, it is possible to reduce the vibration, as compared to a configuration where the turret 130 is not stopped. Further, when the engaging mechanism 138 is engaged to the next recess portion 130B, the moving speed V of the turret 130 is decelerated. That is, according to the first illustrative embodiment, when the engaging mechanism 138 is engaged to the recess portion 130B, the moving speed V of the turret 130 is decelerated so that the moving speed V becomes zero (0). For this reason, it is possible to further reduce the vibration, which is to be caused upon the engagement of the recess portion 130B and the engaging mechanism 138. That is, it is possible to execute the measurement using the target optical element 126 immediately after the switching of the optical element 126. Also, it is possible to prevent a position error due to the vibration, so that it is possible to realize the high precision positioning.

Also, according to the first illustrative embodiment, the moving speed V becomes zero upon the engagement of the engaging mechanism 138 to the recess portion 130B when the moving speed V is continuously decelerated by the maximum deceleration upon the deceleration of the moving speed V. For this reason, until the engaging mechanism 138 is engaged to the recess portion 130B, the moving speed V of the turret 130 is not applied with the rapid acceleration, so that it is possible to further prevent the vibration and wear, which are to occur between the engaging mechanism 138 and the detent 130A.

Also, according to the first illustrative embodiment, the moving speed V is accelerated by the constant acceleration and the moving speed V is decelerated by the same acceleration. For this reason, it is possible to stably accomplish the acceleration and deceleration of the turret 130 and to easily realize the acceleration-deceleration control of the moving speed V. In the meantime, according to the first illustrative embodiment, the deceleration starts before the moving speed V of the turret 130 by the driving device 134 reaches the maximum moving speed. For this reason, the constant moving speed does not appear in the moving speed V shown in FIG. 8A. However, the moving speed V may also be controlled to have a trapezoidal shape.

Also, according to the first illustrative embodiment, the moving speed V of the turret 130 starts to decelerate at the intermediate position between the recess portions 130B. For this reason, it is possible to further simplify the control on the moving speed V of the turret 130 and to securely realize the deceleration of the moving speed V.

Also, according to the first illustrative embodiment, the optical element switching device 120 has the storage unit MR, and the moving speed V is determined by the control signal stored in advance in the storage unit MR. That is, it is not necessary for the operator to make a setting for the driving control of the driving device 134, and it is possible to simply control the driving device 134. In the meantime, the disclosure is not limited thereto. For example, the optical element switching device may or may not have the storage unit MR, and the operator may directly make a setting for the driving control of the driving device through the input unit.

Also, according to the first illustrative embodiment, the driving device 134 is controlled in the feed/forward manner. For this reason, as compared to a configuration where a feedback control is performed, it is possible to reduce the number of the constitutional elements of the optical element switching device 120 and to simplify the control. In the meantime, the disclosure is not limited thereto. For example, the driving device may be controlled in the feedback manner.

Also, according to the first illustrative embodiment, the optical element switching device 120 has the sensors 144 configured to detect the positions corresponding to the recess portions 130B. For this reason, it is possible to specify the optical element 126 actually positioned on the optical axis O.

Although the description is not made with reference to FIG. 7, according to the first illustrative embodiment, when the engaging mechanism 138 is engaged to each of the recess portions 130B (for example, step S12 of FIG. 7), it is possible to correct the driving signal for driving the driving device 134, based on the output of the sensor 144. In this case, even when there is a difference between the position of the recess portion 130B assumed by the set driving pulse signal and the position of the recess portion 130B by the actual output of the sensor 144, the difference can be reset and the difference can be prevented from being accumulated between the plurality of recess portions 130B. That is, it is possible to implement the positioning of the turret 130 more rapidly and with high precision. In the meantime, the disclosure is not limited thereto. For example, the detection unit may not be necessarily provided.

That is, according to the first illustrative embodiment, it is possible to relax impact load, which is to be applied to the engaging mechanism 138 whenever passing the recess portion 130B, so that it is possible to prevent the durability from being lowered due to the switching of the optical element 126.

Although the disclosure has been described with reference to the first illustrative embodiment, the disclosure is not limited to the first illustrative embodiment. That is, improvements and design changes can be made without departing from the gist of the disclosure.

Figure 9A:
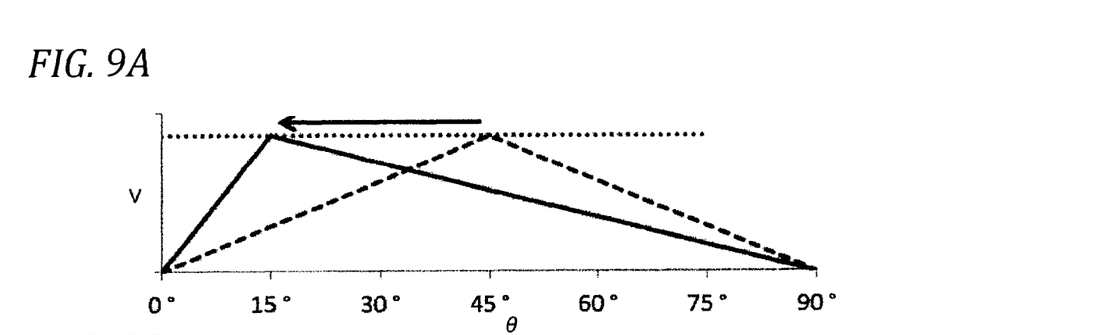
FIG. 9A illustrates a change in the moving speed relative to the rotating angle of the turret according to a second illustrative embodiment.
Figure 9B:
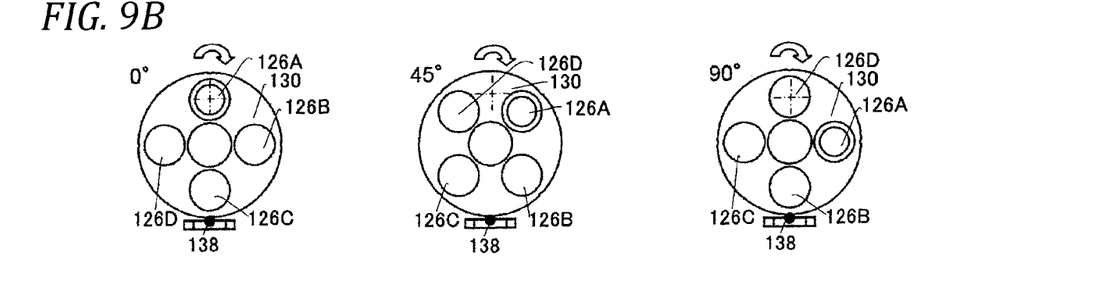
FIG. 9B is a top view showing arrangement of the turret according to the second illustrative embodiment and the engaging mechanism, showing a positional relation thereof when the rotating angle θ is 0°, 45° and 90° from a left side.

For example, in the first illustrative embodiment, the moving speed V starts to decelerate at the intermediate position between the recess portions 130B. However, the disclosure is not limited thereto. For example, a second illustrative embodiment shown in FIGS. 9A and 9B is also possible. FIG. 9A shows a change in the moving speed V relative to the rotating angle θ (0° to 90°). FIG. 9B is a top view showing arrangement of the turret 130 and the engaging mechanism 138, showing a positional relation thereof when the rotating angle θ is 0°, 45° and 90° from a left side. In the meantime, the optical element 126A is particularly denoted by a white double circle. Also, a cross shape denoted by a dashed-dotted line indicates the optical axis O. Also, an outline arrow indicates the moving direction (rotating direction) P.

In the second illustrative embodiment, the moving speed V of the turret 130 starts to decelerate at a position before the intermediate position between the recess portions 130B. Specifically, the moving speed V starts to decelerate from a position of the rotating angle θ=15°. That is, since the moving speed V starts to decelerate at earlier timing, even when a magnitude of the deceleration is constant, a magnitude of the deceleration of the moving speed V is smaller at the end of the deceleration, as compared to the start of the deceleration of the moving speed V. For this reason, according to the second illustrative embodiment, it is possible to further reduce the moving speed V immediately before the engagement to the recess portion 130B, as compared to the first illustrative embodiment. Thereby, it is possible to further reduce the impact load, which is to be applied when the engaging mechanism 138 is engaged to the recess portion 130B, so that it is possible to further reduce the vibration.

Alternatively, the moving speed V may start to decelerate at a position after the intermediate position between the recess portions 130B. In this case, it is possible to implement the movement of the turret 130 more rapidly, as compared to the first illustrative embodiment, so that it is possible to rapidly switch the optical element 126.

Figure 10A:
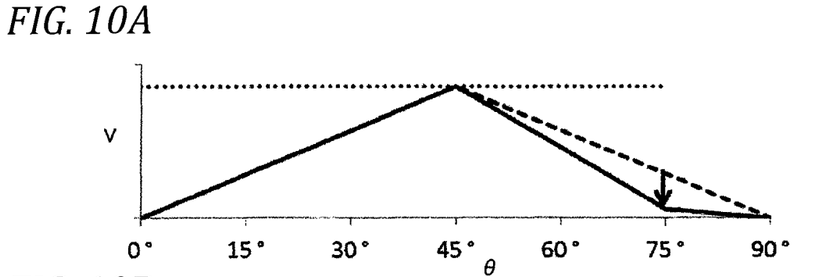
FIG. 10A illustrates a change in the moving speed relative to the rotating angle of the turret according to a third illustrative embodiment.
Figure 10B:
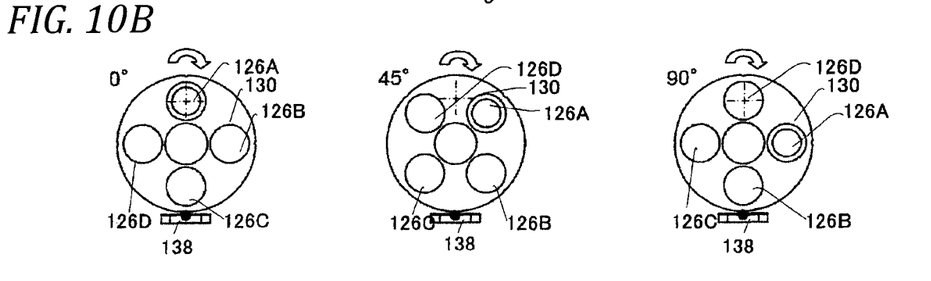
FIG. 10B is a top view showing arrangement of the turret according to the third illustrative embodiment and the engaging mechanism, showing a positional relation thereof when the rotating angle θ is 0°, 45° and 90° from a left side.

In the above illustrative embodiments, the magnitude of the deceleration of the moving speed V is constant from the start of the deceleration of the moving speed to the end of the deceleration. However, the disclosure is not limited thereto. For example, a third illustrative embodiment shown in FIGS. 10A and 10B is also possible. FIG. 10A shows a change in the moving speed V relative to the rotating angle θ (0° to 90°). FIG. 10B is a top view showing arrangement of the turret 130 and the engaging mechanism 138, showing a positional relation thereof when the rotating angle θ is 0°, 45° and 90° from a left side. In the meantime, the optical element 126A is particularly denoted by a white double circle. Also, a cross shape denoted by a dashed-dotted line indicates the optical axis O. Also, an outline arrow indicates the moving direction (rotating direction) P.

In the third illustrative embodiment, as shown in FIG. 10A, the moving speed V starts to decelerate at the intermediate position between the recess portions 130B. However, the magnitude of the deceleration of the moving speed V is smaller at the end of the deceleration, as compared to the start of the deceleration of the moving speed V. Specifically, upon the start of the deceleration of the moving speed V, the deceleration starts by the deceleration higher than upon the acceleration. Then, the deceleration is remarkably reduced from a predetermined position (for example, a position of θ=75°). That is, the deceleration is made by a value smaller than the magnitude of the acceleration upon the acceleration, immediately before the engaging mechanism 138 is engaged to the next recess portion 130B. For this reason, according to the third illustrative embodiment, while it is possible to implement the substantially same moving time of the turret 130 as the first illustrative embodiment, it is possible to further reduce the impact load, which is to be applied when the engaging mechanism 138 is engaged to the recess portion 130B, as compared to the first illustrative embodiment. In the meantime, according to the third illustrative embodiment, when the moving speed V is continuously decelerated by the maximum deceleration upon the deceleration of the moving speed V, the moving speed V becomes zero before the engaging mechanism 138 is engaged to the recess portion 130B.

Also, in the above illustrative embodiments, the turret 130 has the disc shape. However, the disclosure is not limited thereto. For example, a fourth illustrative embodiment shown in FIG. 11 is also possible.

Figure 11:
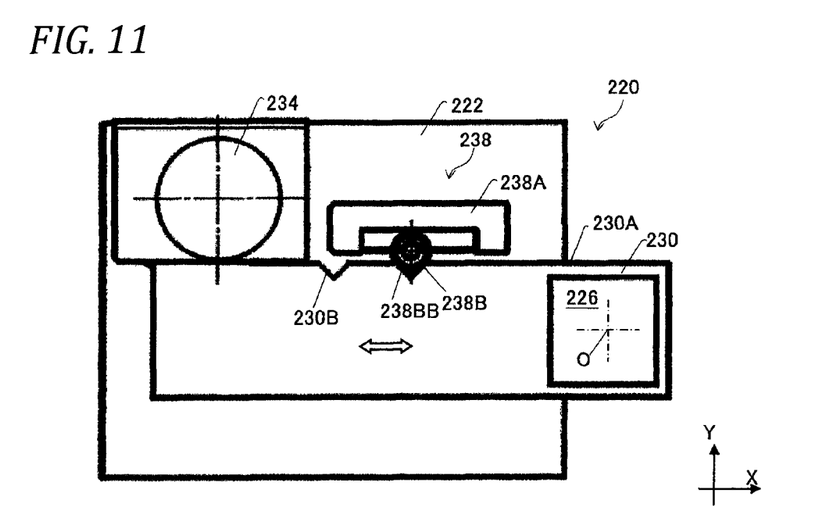
FIG. 11 is a pictorial view showing an optical element switching device according to a fourth illustrative embodiment of the disclosure.

In the fourth illustrative embodiment, as shown in FIG. 11, an optical element switching device 220 has a configuration where a moveable member 230 configured to hold one optical element 226 is arranged on a fixing member 222 via a linear slider (not shown). The optical element 226 is a member configured to move into or out of the optical axis O. For example, the moveable member 230 is provided with a rack (not shown), and a pinion (not shown) provided for a driving device 234 and the rack are meshed with each other, so that the moveable member 230 is controlled to linearly move relative to the fixing member 222. A detent 230A is provided at an upper surface (of FIG. 11) of the moveable member 230, and is arranged relative to the fixing member 222 so that an engaging mechanism 238 confronts to the detent 230A. In the fourth illustrative embodiment, it is possible to easily increase or decrease the number of the optical elements 226 to be arranged, as compared to the disc shape.

Also, in the above illustrative embodiments, the one or four optical elements are provided. However, the disclosure is not limited thereto. For example, one or more optical elements may be provided.

The disclosure can be widely applied to the optical element switching device that is to be used for an image measurement apparatus including a microscope and the like.

What is claimed is:

1. A moving speed control method of an optical element switching device comprising a fixing member, a moveable member having a plurality of recess portions configured to hold one or more optical elements and provided for positioning in correspondence to each of the one or more optical elements and moveably supported to the fixing member, a driving device supported to the fixing member and configured to move the moveable member, and an engaging mechanism supported to the fixing member and configured to be engaged to one of the recess portions to thereby position each of the one or more optical elements on an optical axis, the moving speed control method comprising:
   starting to move the moveable member from a state where the one of the recess portions is engaged to the engaging mechanism;
   accelerating a moving speed of the moveable member;
   decelerating the moving speed before the engaging mechanism is to be engaged to a next one of the recess portions; and
   making the moving speed zero when the engaging mechanism is engaged to the next one of the recess portions,
   wherein the deceleration of the moving speed starts at a midpoint position which is equidistant from the one of the recess portions where the accelerating starts and the next one of the recess portions where the moving speed becomes zero or at a position between the one of the recess portions where the accelerating starts and the midpoint position,
   the accelerating the moving speed comprises accelerating the moving speed by constant acceleration, and
   the decelerating the moving speed comprises decelerating the moving speed by constant deceleration.

2. The moving speed control method according to claim 1, wherein
   the optical element switching device includes a storage unit; and
   the moving speed is determined by a control signal stored in advance in the storage unit.

3. The moving speed control method according to claim 1, wherein the optical element switching device includes a detection unit configured to detect positions corresponding to the recess portions; and when the engaging mechanism is engaged to each of the recess portions, a driving signal for driving the driving device is corrected on the basis of an output of the detection unit.

\* \* \* \* \*